(12) United States Patent
Bumiller et al.

(10) Patent No.: US 7,725,734 B2
(45) Date of Patent: *May 25, 2010

(54) MOBILE SOFTWARE TERMINAL IDENTIFIER

(75) Inventors: George B. Bumiller, Ramsey, NJ (US); Adrian Buckley, Tracy, CA (US)

(73) Assignee: Research in Motion Limited, Waterloo (CA)

( * ) Notice: Subject to any disclaimer, the term of this patent is extended or adjusted under 35 U.S.C. 154(b) by 46 days.

This patent is subject to a terminal disclaimer.

(21) Appl. No.: 12/149,896

(22) Filed: May 9, 2008

(65) Prior Publication Data

US 2008/0208921 A1    Aug. 28, 2008

Related U.S. Application Data

(63) Continuation of application No. 11/288,417, filed on Nov. 29, 2005, now Pat. No. 7,389,426.

(51) Int. Cl.
*G06F 11/30* (2006.01)
*G08B 29/18* (2006.01)

(52) U.S. Cl. ..................... 713/187; 380/270; 726/34

(58) Field of Classification Search ........... 713/187; 726/34; 380/270
See application file for complete search history.

(56) References Cited

U.S. PATENT DOCUMENTS 5,398,285 A    3/1995    Borgelt et al.

(Continued)

FOREIGN PATENT DOCUMENTS

EP    1 227 106    11/2002

(Continued)

OTHER PUBLICATIONS

European Search Report and Written Opinion for PCT/CA2006/001941.

*Primary Examiner*—Christian LaForgia

(57) ABSTRACT

An electronic device, including at least one software component and at least one hardware component, generates a hash value by performing a hashing algorithm on an identifier of the at least one software component and an identifier of the at least one hardware component. The electronic device uses this generated hash value to determine whether software used by the electronic device for accessing a wireless network remains unmodified.

21 Claims, 8 Drawing Sheets

U.S. PATENT DOCUMENTS

| | | |
|---|---|---|
| 5,850,559 A | 12/1998 | Angelo et al. |
| 5,944,821 A | 8/1999 | Angelo |
| 6,243,468 B1 | 6/2001 | Pearce et al. |
| 6,707,915 B1 | 3/2004 | Jobst et al. |
| 6,898,286 B2 | 5/2005 | Murray |
| 6,952,770 B1 | 10/2005 | Mittal et al. |
| 7,003,672 B2 | 2/2006 | Angelo et al. |
| 7,065,680 B2 | 6/2006 | Mantyla |
| 2002/0098830 A1 | 7/2002 | Lauper et al. |
| 2004/0064695 A1 | 4/2004 | Lotspiech |
| 2004/0260923 A1 | 12/2004 | Nakai et al. |
| 2004/0268122 A1 | 12/2004 | Satarasinghe et al. |
| 2005/0003765 A1 | 1/2005 | Alfano et al. |
| 2005/0003803 A1 | 1/2005 | Buckley |
| 2005/0005098 A1 | 1/2005 | Michaelis et al. |
| 2005/0005099 A1 | 1/2005 | Naruse et al. |
| 2005/0020270 A1 | 1/2005 | Buckley |
| 2006/0041568 A1 | 2/2006 | Mahalal |
| 2006/0059571 A1 | 3/2006 | Chen et al. |
| 2006/0133612 A1 | 6/2006 | Abedi et al. |
| 2007/0061897 A1 | 3/2007 | Holtzman et al. |

FOREIGN PATENT DOCUMENTS

| | | |
|---|---|---|
| WO | 2004/092886 A2 | 10/2004 |
| WO | 2005/006106 | 1/2005 |
| WO | 2005/006109 | 1/2005 | though of this invention relate a mobile
MOBILE SOFTWARE TERMINAL IDENTIFIER

This application is a continuation of application Ser. No. 11/288,417, filed on Nov. 29, 2005, the contents of which are incorporated herein by reference in its entirety.

BACKGROUND

1. Technical Field

Exemplary embodiments of this invention relate a mobile software terminal identifier. More particularly, exemplary embodiments of this invention relate to a mobile software terminal identifier which is generated as a hash value and used to ensure that software for interfacing with a wireless network has not been modified in an unauthorized manner, and to track terminal hardware and terminal software for obtaining wireless access.

2. Description of Related Art

The use of a hash algorithm on a PC has be performed by Microsoft®. The hash algorithm is used to ensure that the Microsoft® operating system software only operates on the PC on which it was originally installed. Alternatively, the hash algorithm is used to ensure that the Microsoft® operating system only operates on the PC to which it has been moved and that the operating system has been re-validated by Microsoft®.

Many known mobile terminals are "closed" devices which permit essentially no user access to the software programming of the device (except recently for .applications). These terminals are thus "fixed" except for the terminal manufacturer's initiated bug fixes and upgrades. Each of these terminals that uses a licensed Third-Generation Partnership Protocol (3GPP) radio band is identified by an international mobile equipment identifier (IMEI). This IMEI is a unique number that can be accessed by a network operator. This IMEI may be linked to the manufacturer of the terminal and the testing that ensured that the terminal conformed to the 3GPP requirements.

A new configuration of "terminal" has now been developed with the addition of a wireless local area network (WLAN) to the 3GPP access technologies. This "terminal" or "user equipment" may include a personal computer (PC) or personal digital equipment (PDA) or other device with a processor plus WLAN capability software (either built-in or added via a network interface card (NIC)) for WLAN access to the 3GPP network operator, and a subscription identification module (SIM or universal subscription identification module (USIM)) with a reader to interface the SIM (or USIM) to the PC and its software. This terminal has no IMEI since it does not use a licensed 3GPP radio band.

This "terminal" may be assembled by the user. Since it is PC or PDA-based, there is an opportunity to "hack" the software used to interface with the network operator. This opportunity to "hack" the software is much greater than in the "closed" terminals used in the licensed 3GPP radio bands. With the WLAN "terminal" configured by the user (or by others) which is based on a PC or PDA, there is no means of tracking the software used for the 3GPP WLAN access or tracking the "terminal" (i.e., computer plus WLAN NIC and software). There is also no means of ensuring that the software has not been "hacked." Even further, there is no means for the network operator to "personalize" the "terminal" to ensure that the terminal (which includes software provided by the 3GPP network operator) operates only with a SIM or USIM provided by the network operator.

SUMMARY

Such problems are solved by generating and using an international mobile software terminal identifier (IMSTI) unique to the terminal (the hardware and software configuration), which identifies the terminal. This IMSTI, together with software on the SIM or USIM, ensures that the software for providing an interface for wireless access has not been changed. The software used in the terminal for obtaining wireless access to a network can thus be secured and checked to prevent its replacement by rogue software which would compromise the user and the network.

The IMSTI may be used when the SIM or USIM is in a radio module which has an IMEI. Should all the WLAN 3GPP access software be stored on the NIC (that has an IMEI), then the IMEI would provide an identity function and security of the software.

In one exemplary embodiment, a method for use in an electronic device, including at least one software component and at least one hardware component, comprises generating a hash value by performing a hashing algorithm on an identifier of the at least one software component and an identifier of the at least one hardware component, and determining whether software used by the electronic device for accessing a wireless network remains unmodified based on the generated hash value. This exemplary embodiment may be embodied in hardware, software or a combination of hardware and software.

The hash value may be stored on a subscriber identity module (SIM) or a universal subscriber identity module (USIM) operatively coupled with the electronic device. The generated hash value may be encrypted prior to being stored in the subscriber identity module (SIM) or the universal subscriber identity module (USIM). The generated hash value may also be encrypted before transmitting this encrypted hash value from the electronic device to the wireless network. The hashing algorithm may also be stored in a subscriber identity module (SIM) or a universal subscriber identity module (USIM) operatively coupled with the electronic device.

Determining whether the software used by the electronic device for access to a wireless network remains unmodified based on the generated hash value may comprise storing the generated hash value, generating another hash value by performing the hashing algorithm on an identifier of the at least one software component and an identifier of the at least one hardware component, and comparing the another hash value with the stored hash value. Determining whether the software used by the electronic device for access to a wireless network remains unmodified based on the generated hash value may alternatively comprise comparing the generated hash value with a previously determined hash value received from the wireless network.

Determining whether the software used by the electronic device for access to the wireless network remains unmodified may be initiated by a start-up process of the electronic device or in response to a challenge signal received by the electronic device from the wireless network. The electronic device may externally transmit a signal indicating the determining of whether the software used by the electronic device for access to the wireless network remains unmodified. For example, after receiving a challenge signal, the electronic device may externally transmit a response signal indicating the determination of whether the software used by the electronic device for access to the wireless network remains unmodified. The transmitted signal may be encrypted.

BRIEF DESCRIPTION OF THE DRAWINGS

These and other advantages of the exemplary embodiments will be more completely understood and appreciated by careful study of the following more detailed description in conjunction with the accompanying drawings, in which.

DETAILED DESCRIPTION OF EXEMPLARY EMBODIMENTS

Figure 1A:
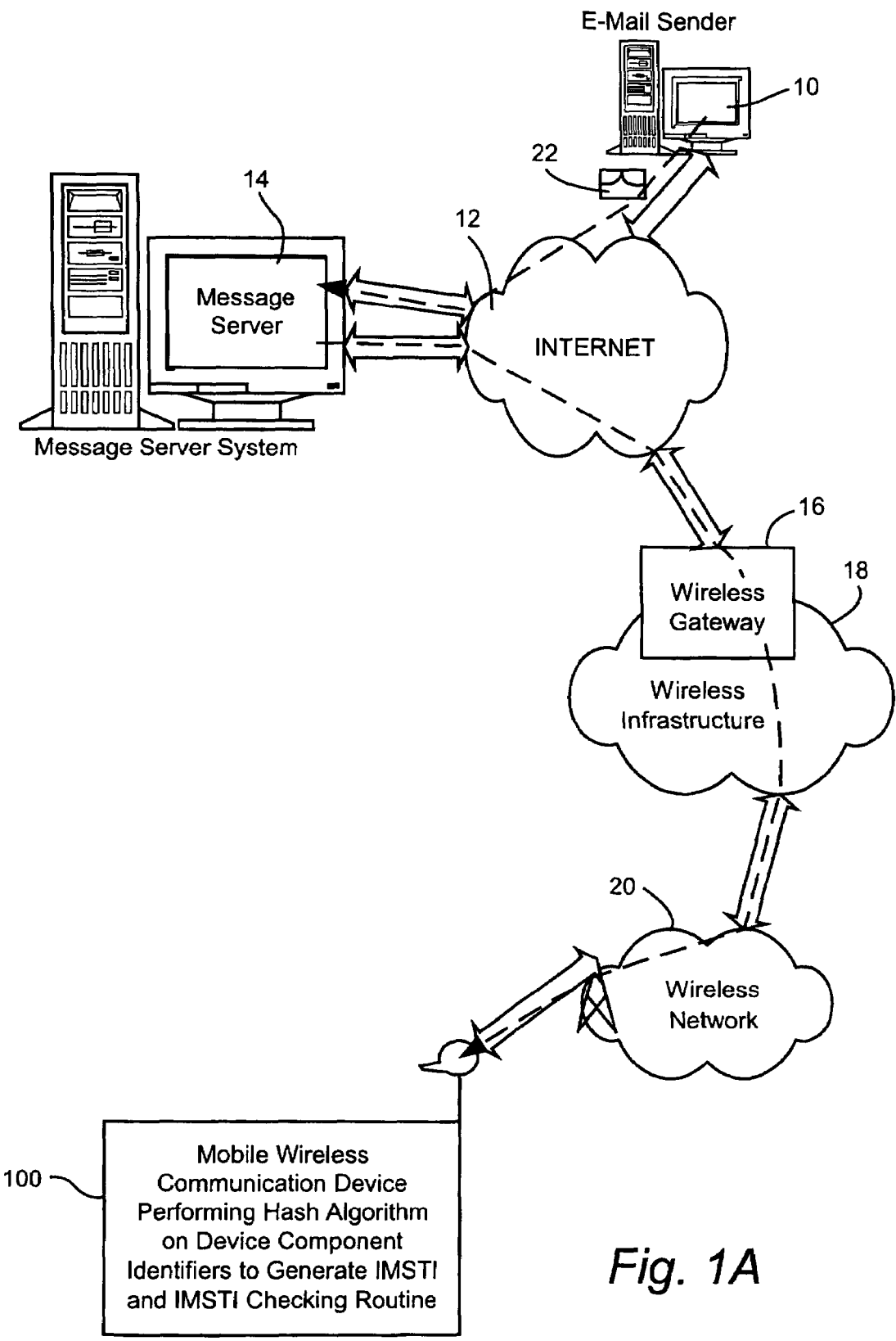
FIG. 1 is an overall system wide schematic view of an exemplary wireless email communication system incorporating a mobile wireless communication device performing a hash algorithm on component identifiers of the device to generate an international mobile software terminal identifier (IMSTI) and performing an associated IMSTI checking routine in accordance with one exemplary embodiment of this invention.
Figure 1B:
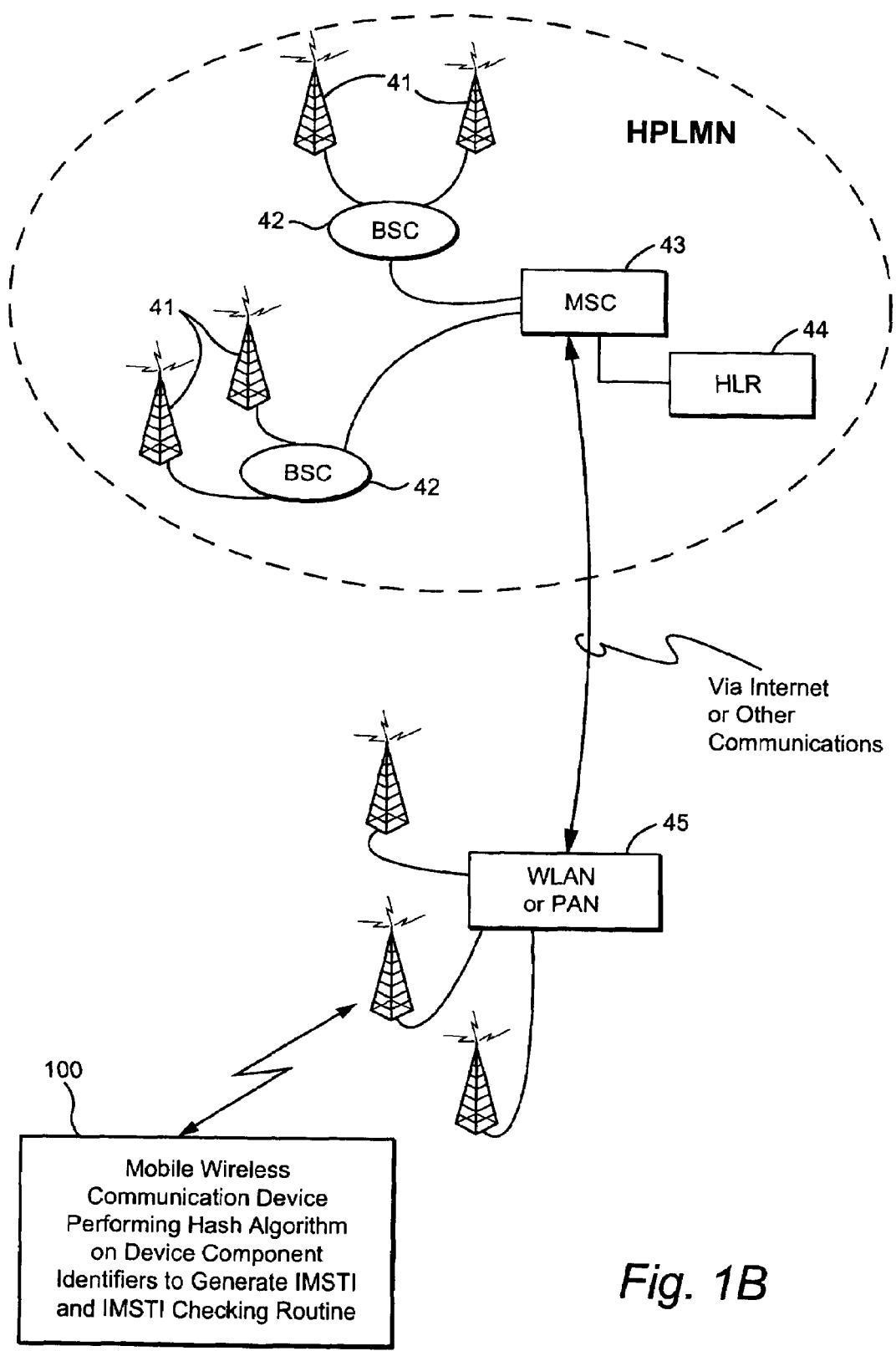

FIG. 1 is an overview of an exemplary communication system in which a wireless communication device 100 may be used in accordance with this invention. One skilled in the art will appreciate that there may be hundreds of different system topologies. There may also be many message senders and recipients. The simple exemplary system shown in FIG. 1 is for illustrative purposes only, and shows perhaps the currently most prevalent Internet e-mail environment.

FIG. 1 shows an e-mail sender 10, the Internet 12, a message server system 14, a wireless gateway 16, wireless infrastructure 18, a wireless network 20 and a mobile communication device 100.

An e-mail sender 10 may, for example, be connected to an ISP (Internet Service Provider) on which a user of the system has an account, located within a company, possibly connected to a local area network (LAN), and connected to the Internet 12, or connected to the Internet 12 through a large ASP (application service provider) such as American Online™ (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 14 may be implemented, for example, on a network computer within the firewall of a corporation, a computer within an ISP or ASP system or the like, and acts as the main interface for e-mail exchange over the Internet 12. Although other messaging systems might not require a message server system 14, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the invention described below. Message servers such as server 14 typically extend beyond just e-mail sending and receiving; they also include dynamic database storage engines that have predefined database formats for data like calendars, to-do lists, task lists, e-mail and documentation.

The wireless gateway 16 and infrastructure 18 provide a link between the Internet 12 and wireless network 20. The wireless infrastructure 18 determines the most likely network for locating a given user and tracks the users as they roam between countries or networks. A message is then delivered to the mobile device 100 via wireless transmission, typically at a radio frequency (RF), from a base station in the wireless network 20 to the mobile device 100. The particular network 20 may be virtually any wireless network over which messages may be exchanged with a mobile communication device.

As shown in FIG. 1, a composed e-mail message 22 is sent by the e-mail sender 10, located somewhere on the Internet 12. This message 22 typically uses traditional Simple Mail Transfer Protocol (SMTP), RFC 822 headers and multipurpose Internet Mail Extension (MIME) body parts to define the format of the mail message. These techniques are all well known to those skilled in the art. The message 22 arrives at the message server 14 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In an exemplary embodiment, messages addressed to a message server account associated with a host system such as a home computer or office computer which belongs to the user of a mobile device 100 are redirected from the message server 14 to the mobile device 100 as they are received.

Regardless of the specific mechanism controlling forwarding of messages to mobile device 100, the message 22, or possibly a translated or reformatted version thereof, is sent to wireless gateway 16. The wireless infrastructure 18 includes a series of connections to wireless network 20. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Group Special Mobile or the Global System for Mobile Communications (GSM) and the General Packet Radio Service (GPRS) networks, and (3) future third-generation (3G) networks like Enhanced Datarates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2A:
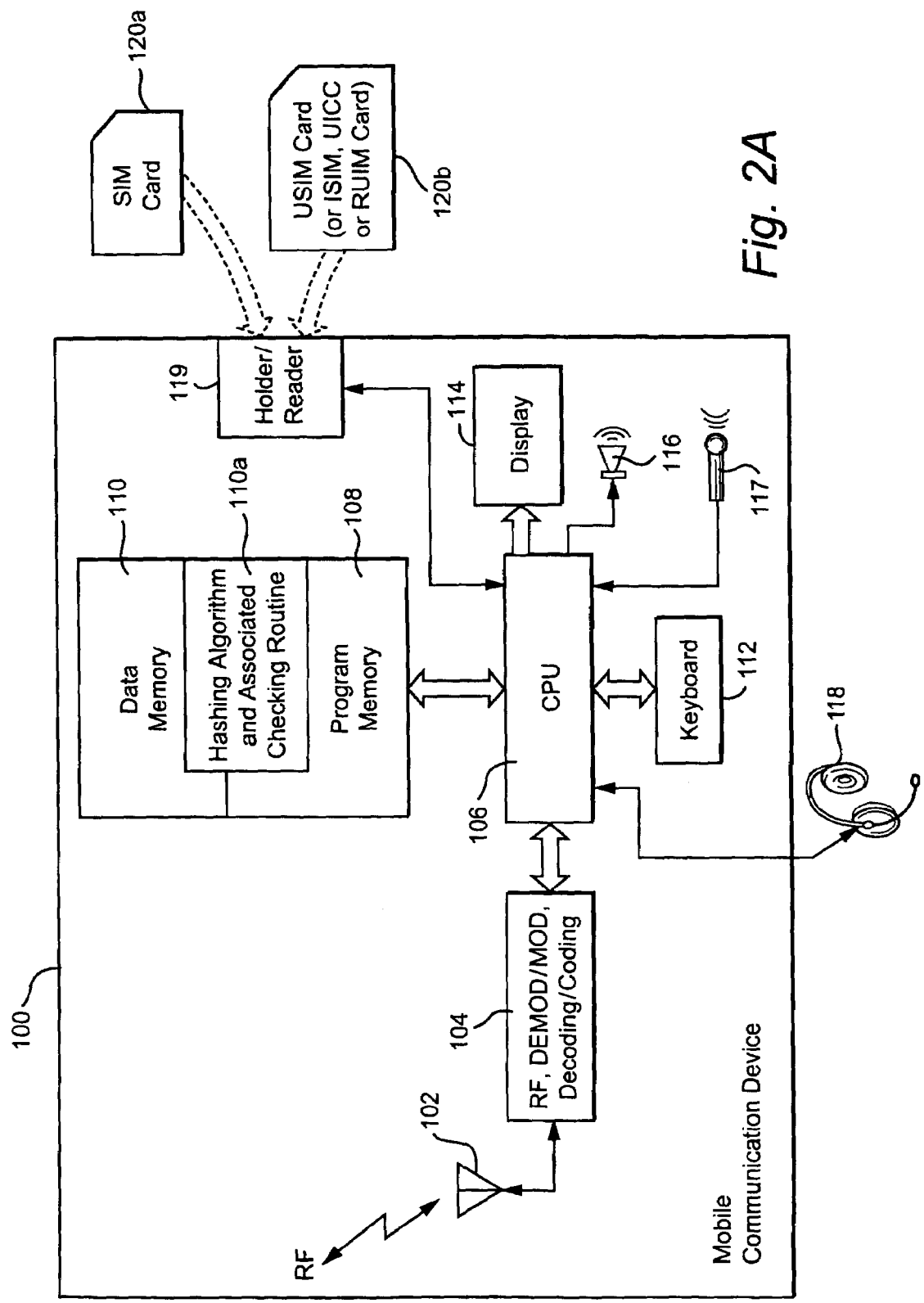
FIG. 2 is an abbreviated schematic diagram of hardware included within an exemplary mobile wireless communication device of FIG. 1.
Figure 2B:
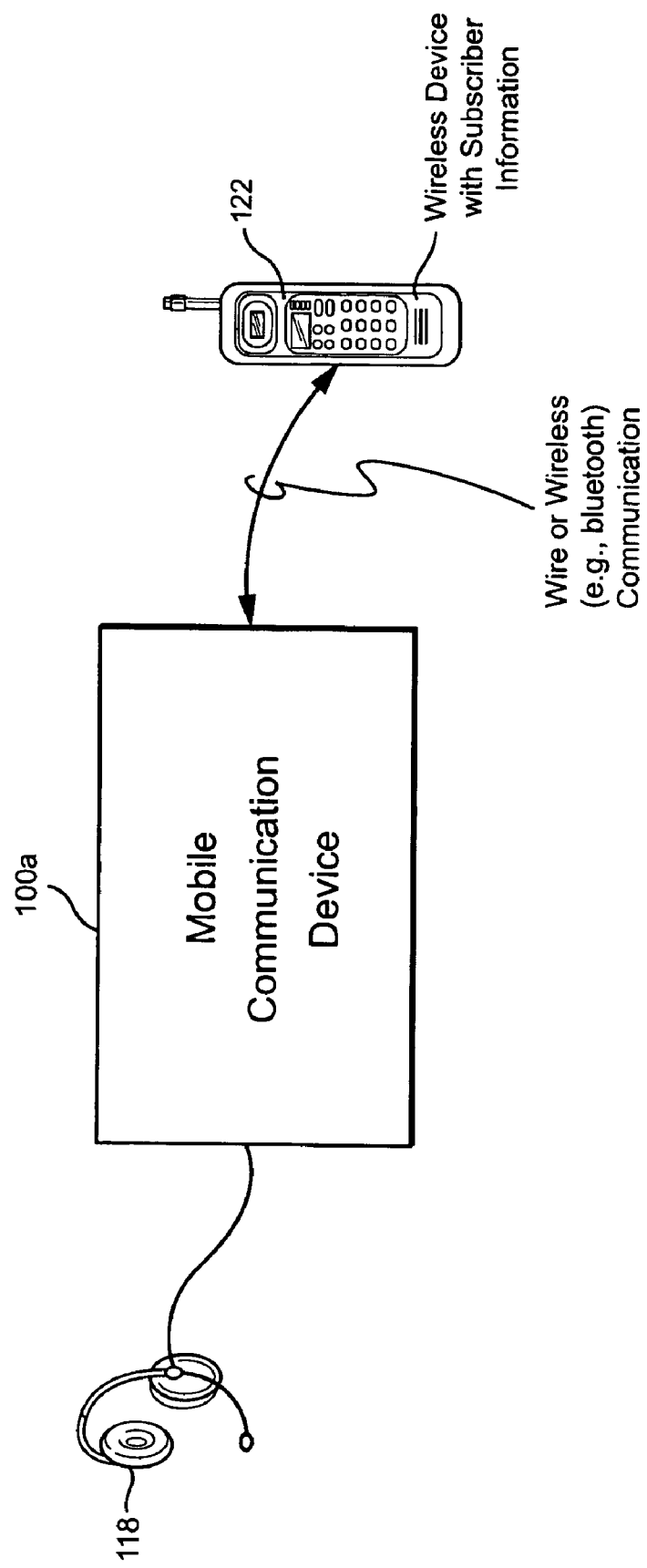

As depicted in FIG. 2, mobile communication device 100 includes a suitable RF antenna 102 for wireless communication to/from wireless network 20. Conventional RF, demodulation/modulation and decoding/coding circuits 104 are provided. As those in the art will appreciate, such circuits can involve possibly many digital signal processors (DSPs), microprocessors, filters, analog and digital circuits and the like. However, since such circuitry is well known in the art, it is not further described.

The mobile communication device 100 will also typically include a main control CPU 106 which operates under control of a stored program in program memory 108 (and which has access to data memory 110). CPU 106 also communicates with a conventional keyboard 112, display 114 (e.g., an LCD) and audio transducer or speaker 116. A portion of program and/or data memory 110a is available for storing a hashing algorithm and associated checking routine which may be loaded from a detachable subscriber identity module (SIM) card 120a or detachable universal subscriber identity module (USIM) card 120b. Suitable computer program executable code is thus stored in portions of memory 110a and/or card 120a, 120b to constitute hashing and associated checking logic as described below.

The hashing algorithm and associated checking routine is loaded into the mobile communication device 100 as part of a 3GPP WLAN terminal software installation process. This installation process includes connecting a WLAN network information card (NIC) into the mobile wireless communication device 100 if the device 100 does not already include a built-in one. The 3GPP WLAN service-enabled SIM card 120a or USIM card 120b (hereinafter referred to as a SIM card 120a, although those skilled in the art will appreciate that a USIM card 120b can alternatively be used) is inserted in the NIC or in a USB SIM reader which is connected to the communication device 100.

After the communication device 100 has been turned on, the 3GPP WLAN terminal software is loaded from the subscriber's (i.e., user's) 3GPP network operator or other approved source, and installed. As part of the installation, the SIM and device software send a message to the wireless network 20 (e.g., a public land mobile network (PLMN)) that the communication device 100 is being configured and enabled. The program logic module for performing a hashing algorithm and associated checking routine is then entered at step 300.

Figure 3:
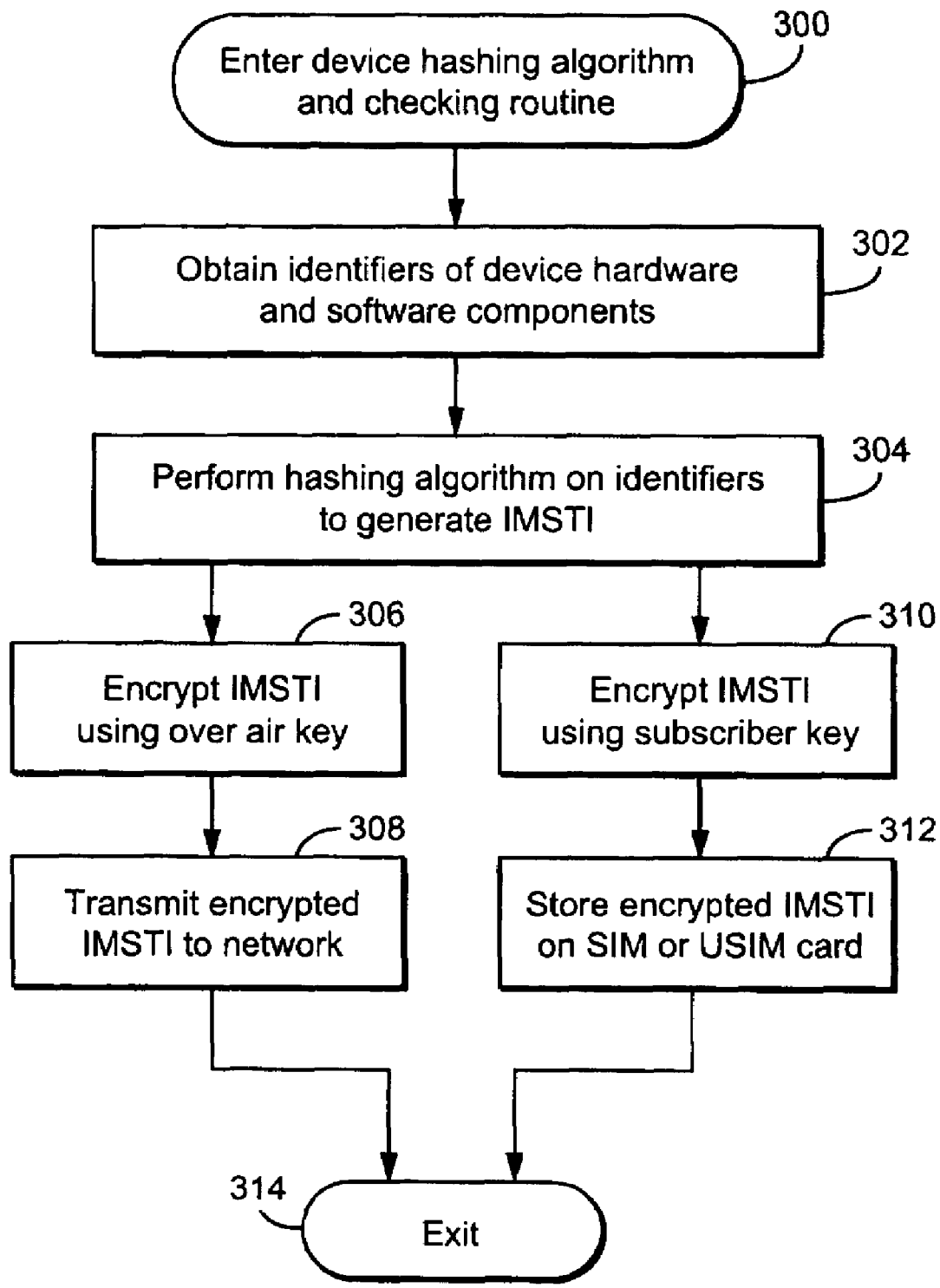
FIG. 3 is an exemplary abbreviated schematic flow chart of computer software (i.e., program logic) that may be utilized in the device of FIG. 2 for providing a hashing algorithm and IMSTI checking routine.

During performance of the program logic module, the hashing algorithm obtains identifiers of hardware and software components of the communication device 100 at step 302. For example, the hashing algorithm obtains an identifier of CPU 106, a serial and type identifier for a hard storage drive forming program memory 108 and/or data memory 110, a communication device type and serial PIN, a WLAN module MAC address identifier, and/or WLAN 3GPP access software identifier. Other identifiers for hardware and software components of the communication device 100 may also be obtained. The identifiers may be encrypted for security purposes. The hashing algorithm, which may be securely stored on the installed SIM card 120a, generates a unique IMSTI using the obtained identifiers at step 304. The IMSTI forms a hash value which is then encrypted using an over air key at step 306 and encrypted using a subscriber key at step 310. The SIM of the communication device 100 then transmits the IMSTI encrypted at step 306 to the wireless network 20 at step 308. Transmitting the encrypted IMSTI to the wireless network 20 may be accomplished using a class 2 short message service (SMS) or other technique. The wireless network 20 stores the encrypted IMSTI and sends confirmation to the communication device 100 that the SIM configuration indicated by the IMSTI has been accepted or rejected. The IMSTI encrypted at step 310 is stored on the SIM card at step 312. The program logic module illustrated in FIG. 3 exits at step 314.

Figure 4:
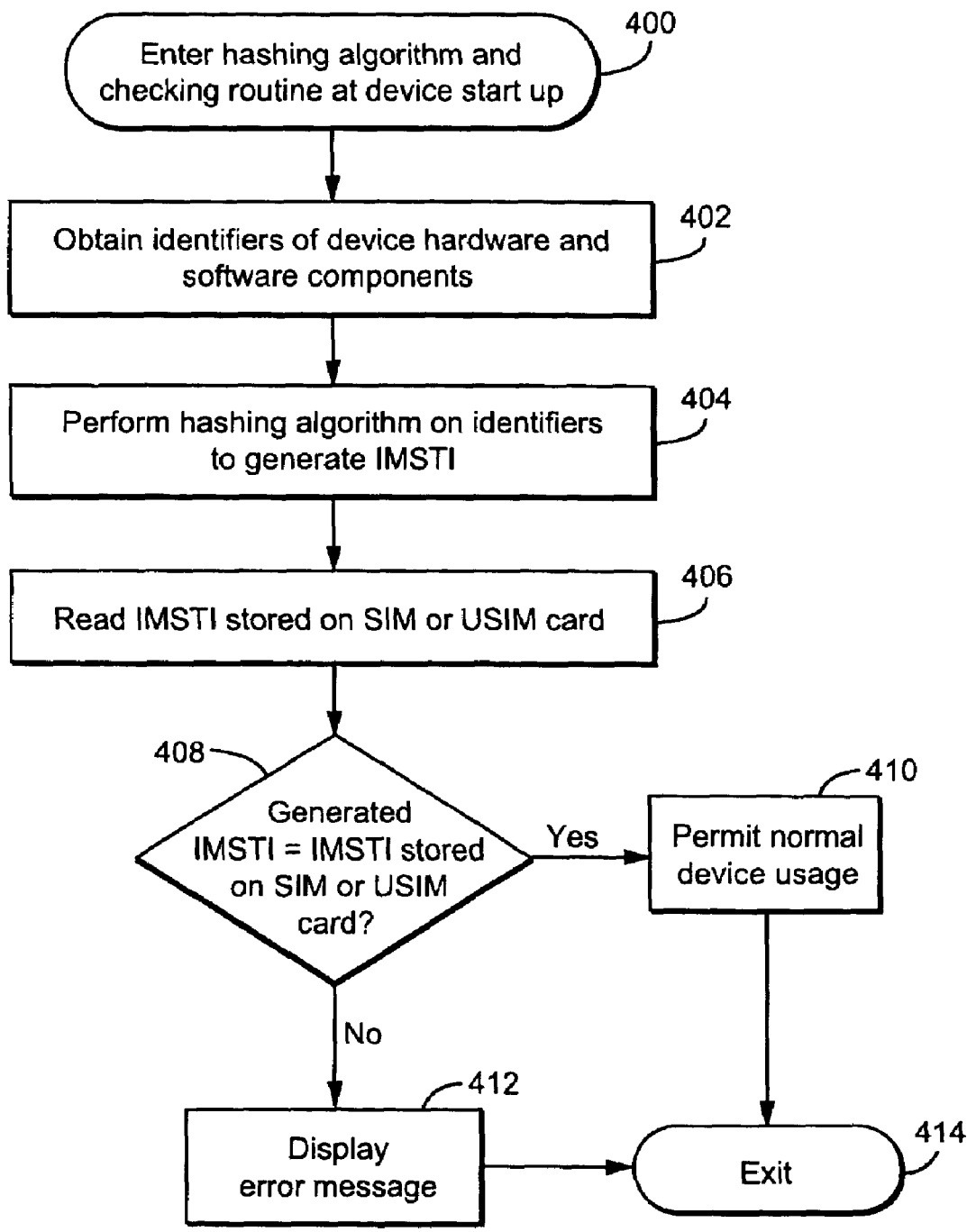
FIG. 4 is an exemplary abbreviated schematic flow chart of computer software (i.e., program logic) that may be utilized in the device of FIG. 2 to perform a hashing algorithm and IMSTI checking routine at a start-up operation of the device.

A program logic module illustrated in FIG. 4 for performing a hashing algorithm and IMSTI checking routine which is initiated at a start-up process of the communication device 100 (e.g., at a start-up process of the SIM) is entered at step 400. The program logic module obtains identifiers of hardware and software components of the communication device 100 at step 402. These hardware and software components may or may not (i.e., the components may be modified) be the same as those whose identifiers are obtained in step 302. These identifiers are encrypted for security purposes since the communication device 100 may be an open platform. The encrypted identifiers are then forwarded to the hashing algorithm stored on the installed SIM card 120a. The hashing algorithm is performed on the obtained identifiers to generate a IMSTI at step 404.

A previously generated IMSTI stored on the SIM card 120a is read at step 406. While FIG. 4 illustrates step 406 being performed after steps 402 and 404, it will be understood that step 406 may alternatively be performed before or at the same time as steps 402 and 404. The IMSTI generated at step 404 is compared to the previously generated IMSTI (i.e., the IMSTI read from the SIM card 120a at step 406) at step 408. If the IMSTI generated at step 404 and the previously generated IMSTI read at step 406 match ("Yes" in step 408), normal device usage is permitted at step 410. If, however, the IMSTI generated at step 404 and the previously generated IMSTI read at step 406 do not match ("No" in step 408), an error message is displayed on the display 114 of the communication device 100 at step 412. This mismatch would occur, for example, if the software and/or hardware components of the communication device 100 have been modified so as to provide different identifiers in step 402 for the hashing algorithm performed in step 404. Performance of the hashing algorithm at step 404 would result in a different hash value being generated based on the different identifiers. In addition to displaying an error message in step 412, a corresponding message indicating this error may be transmitted to the wireless network 20 and/or certain operations of the device (e.g., access to the wireless network to perform a call) may be shut down. By performing the hashing algorithm and associated IMSTI checking routine, device hardware and software may thus be tracked, and it may be determined whether the device software used for interfacing with the wireless network 20 has been hacked. The program logic module illustrated in FIG. 4 exits at step 414.

Figure 5:
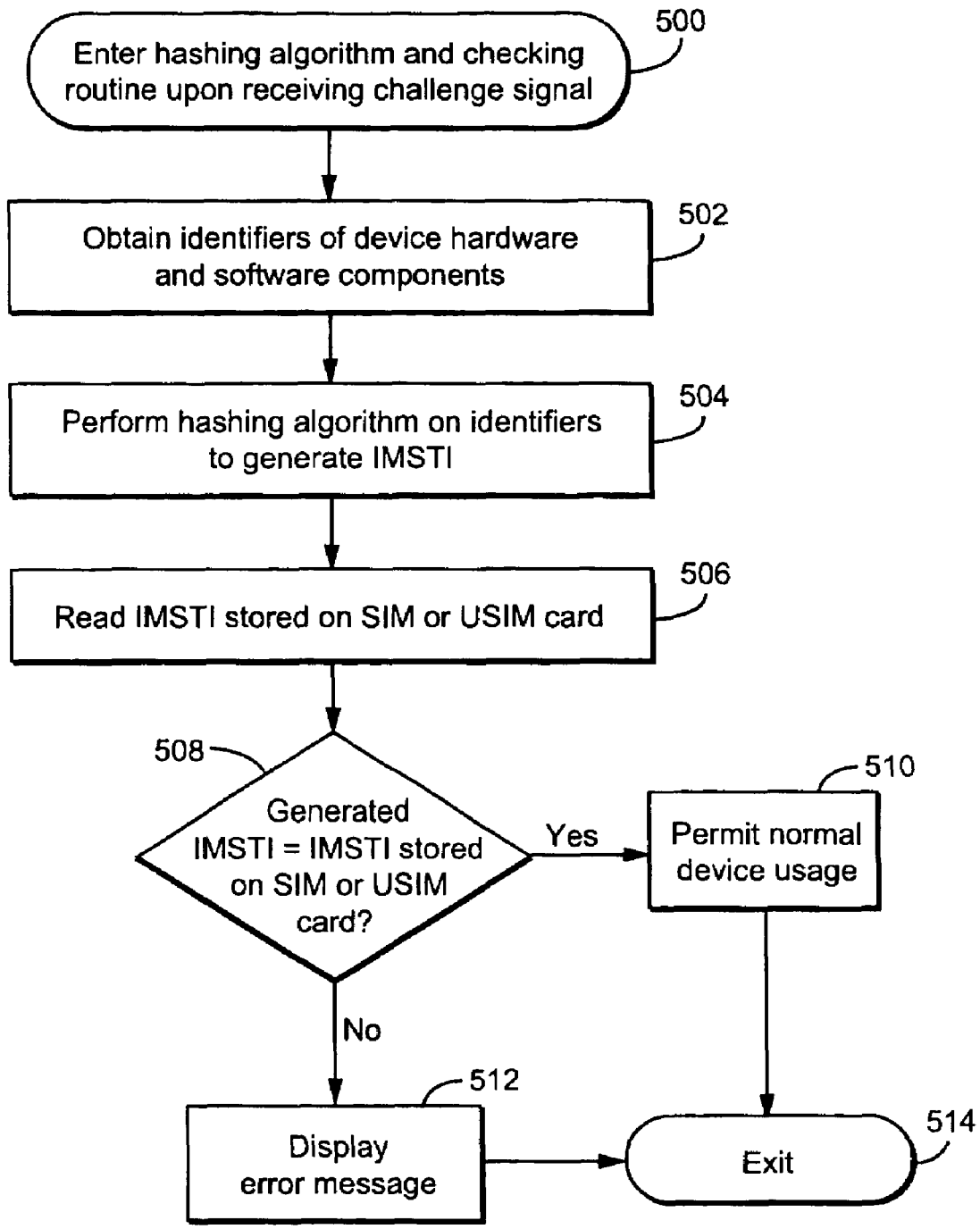
FIG. 5 is an exemplary abbreviated schematic flow chart of computer software (i.e., program logic) that may be utilized in the device of FIG. 2 to perform a hashing algorithm and IMSTI checking routine upon receipt of a challenge signal from a wireless network.

In addition to (or alternatively to) the program logic module illustrated in FIG. 4 involving performing a hashing algorithm and associated IMSTI checking routine at a device start-up process, a program logic module illustrated in FIG. 5 for performing a hashing algorithm and associated IMSTI checking routine which is initiated upon the communication device's receipt of a challenge signal from the wireless network 20 may be entered at step 500. After receiving the challenge signal, the program logic module illustrated in FIG. 5 obtains identifiers of hardware and software components from the communication device 100 at step 502. These hardware and software components may or may not (i.e., components may be modified) be the same as those components whose identifiers were obtained in step 302. These identifiers are encrypted for security purposes since the communication device 100 may be an open platform. The encrypted identifiers are forwarded to the hashing algorithm stored on the installed SIM card 120*a*. The hashing algorithm generates a IMSTI based on the identifiers at step 504.

A previously generated IMSTI stored on the SIM card 120*a* is then read at step 506. While FIG. 5 illustrates step 506 being performed after steps 502 and 504, it will be understood that step 506 may instead be performed before or at the same time as steps 502 and 504. The IMSTI generated in step 504 is compared to the previously generated IMSTI (i.e., the IMSTI read from the SIM card 120*a* at step 506) at step 508. If the IMSTI generated at step 504 and the previously generated IMSTI read at step 506 match ("Yes" in step 508), normal device usage is permitted at step 510. If, however, the IMSTI generated at step 504 and the previously generated IMSTI read at step 506 do not match ("No" in step 508), an error message is displayed on the display 114 of the communication device 100 at step 512. This would occur, for example, if the software and/or hardware components of the communication device 100 have been modified, thereby resulting in different identifiers in step 502 being provided to the hashing algorithm performed in step 504. In addition to displaying an error message in step 512, a corresponding message indicating this error may be transmitted to the wireless network 20 and/or certain operations of the communication device 100 such as access to the wireless network to perform a call may be prevented.

Accordingly, a program logic module for performing a hashing algorithm to generate an IMSTI as a hash value and an IMSTI checking routine may be initiated during a device start-up process (FIG. 4) and/or upon the device's receipt of a challenge signal from the wireless network 20 (FIG. 5). The performance of this program logic module, irrespective of how started, will allow a determination to be made regarding whether the device hardware and/or software for forming an interface with the wireless network 20 has been modified since a modified interface will provide a different IMSTI as a result of the performance of the hash algorithm. Security for the communication device and network can thus be preserved. The program logic module illustrated in FIG. 5 exits at step 514.

The wireless network 20 may transmit a challenge signal to the communication device 100 either randomly or on a predetermined periodic basis. After receiving this challenge signal, the communication device may perform a process less strenuous than a full check required to perform the full hash as described in steps 502-504. For example, after receiving the challenge signal, the SIM may check only for the identifier of a selected component(s) such as the WLAN MAC address or serial number of CPU 106. These identifiers are less than the full set of identifiers required to perform a full hash as described in steps 502-504. These identifiers would be compared to corresponding values stored in the SIM card 120*a* to check the configuration of the communication device 100.

If the retrieved identifier matches the corresponding identifier read from the SIM card 120*a*, an acknowledgement is sent from the SIM to the wireless network 20 and normal device usage is permitted. If, however, the retrieved identifier and the corresponding identifier stored in the SIM card 120*a* do not match, an error message may be displayed and further processing (e.g., disconnect call, prevent wireless access) may be performed. Accordingly, a process involving less than a full hash may be performed in response to receipt of a challenge signal in order to determine whether there have been any, possibly unauthorized, changes to the hardware and/or software of the communication device 100.

Should a user need to operate the terminal with SIMs from different network operators, WLAN access software from each of the SIMs' network operators must be installed. In this case, the SIM will select the WLAN software that its corresponding network operator has provided. Alternatively, different SIM cards from the same network operator may be inserted by the user into the communication device 100. These different SIM cards permit personalization of the operation the communication device 100 to be performed. Typically, each of the SIM cards from the same operator store a common hashing algorithm and associated checking routine. Accordingly, if the SIM card currently installed in the communication device 100 is not the one used during the installation of the network operator's WLAN software, it may still have the same hashing algorithm if it is provided by the same network operator.

Figure 6:
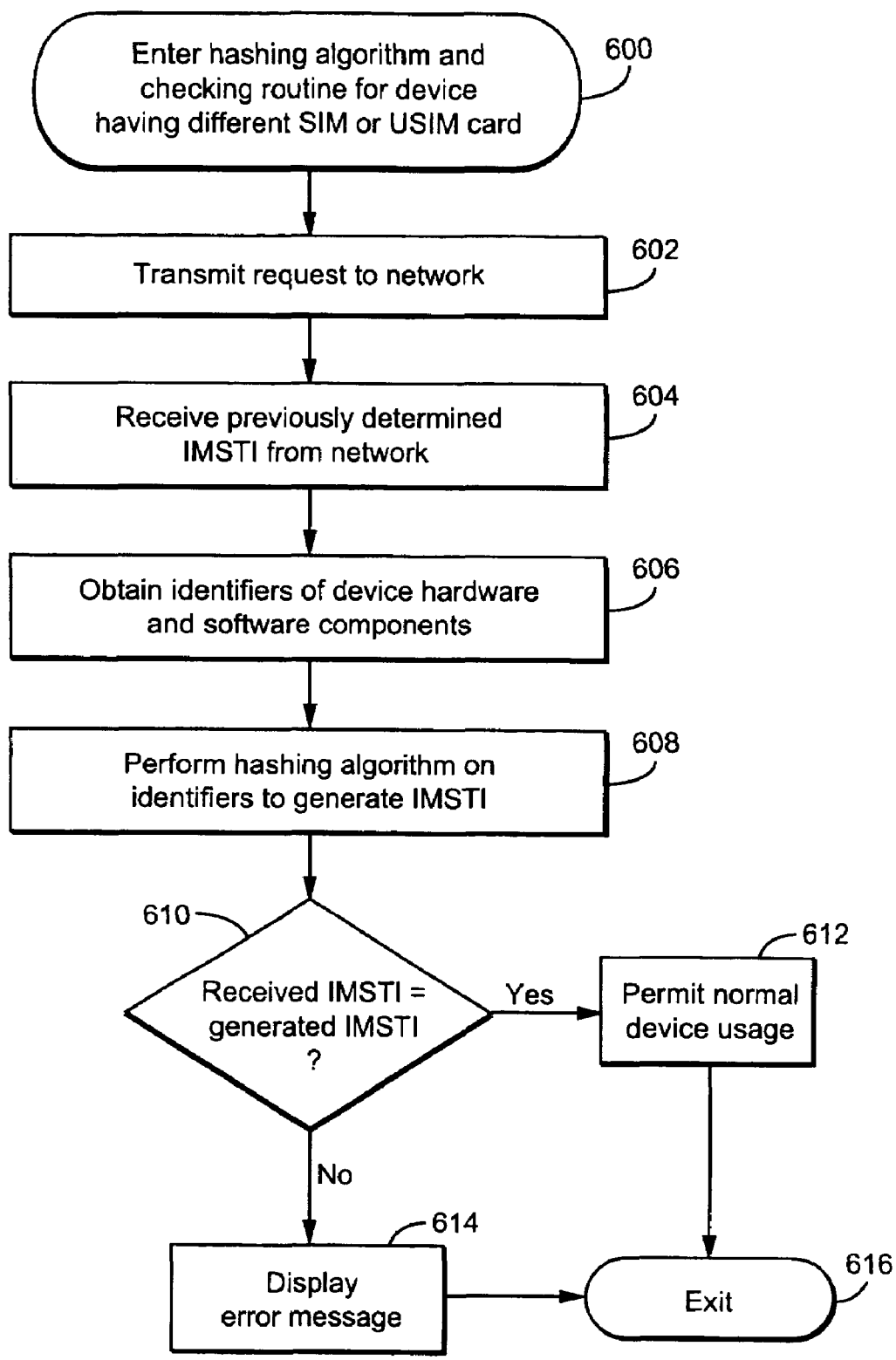
FIG. 6 is an exemplary abbreviated schematic flow chart of computer software (i.e., program logic) that may be utilized in the device of FIG. 2 to perform a hashing algorithm and IMSTI checking routine for a device having a different SIM or USIM card upon transmission of a request from the mobile wireless communication device to a wireless network.

A program logic module illustrated in FIG. 6 for performing a hashing algorithm and checking routine for a device having different SIM cards is entered at step 600. This program logic module, however, may be performed for checking the IMSTI of a communication device 100 having the same SIM card if it has transmitted a validation request to the wireless network 20. In this case, the program logic module performing the hashing algorithm and checking routine after transmitting the validation request may be performed alternatively or in addition to those program logic modules illustrated in FIGS. 4 and 5.

When a different SIM card 120*a* from the same network operator is installed into the communication device 100, the SIM card of the device 100 transmits a validation request to the wireless network 20 at step 602. The wireless network 20 encrypts and securely downloads a previously generated IMSTI to the requesting SIM at step 604. The previously generated IMSTI results from a hash algorithm which has been previously performed on device component identifiers when another SIM was installed in the communication device 100. The program logic module then obtains identifiers of hardware and/or software components of the communication device 100 at step 606. A hashing algorithm is performed based on the obtained identifiers to generate an IMSTI at step 608. The IMSTI received from the wireless network 20 at step 604 is then checked against the IMSTI of the communication device 100 calculated at step 608 to see if they match at step 610. If there is a match ("Yes" in step 610), the device software and hardware are validated as accepted versions (and not rogue version(s)) by the network operator. The software accessing the wireless network has thus been validated as being properly configured and registered with the operator of wireless network 20. Normal device usage is thus permitted at step 612.

If, however, the previously determined IMSTI received at step 604 does not match the IMSTI generated at step 608 ("No" in step 610), an error message is displayed at step 614. The SIM does not allow operation. The device software must be reinstalled. The program logic module illustrated in FIG. 6 exits at step 616.

While the invention has been described in connection with what is presently considered to be practical exemplary embodiments, it is to be understood that the invention is not limited to the disclosed embodiments, but, on the contrary, is intended to cover all variations, modifications and equivalent arrangements included within the spirit and scope of the appended claims.

What is claimed is:

1. A method for use in an electronic device including at least one software component and at least one hardware component, the method comprising:

performing an installation process comprising the steps of:
generating, in the electronic device, a hash value by performing a hashing algorithm on an identifier of the at least one software component and an identifier of the at least one hardware component; and
storing the generated hash value;

subsequent to performing the installation process, performing a start-up process comprising the steps of:
generating, in the electronic device, another hash value by performing the hashing algorithm on an identifier of the at least one software component and an identifier of the at least one hardware component;
comparing the another hash value with the stored hash value;
determining whether software used by the electronic device for accessing a wireless network remains unmodified based on the comparison of the another hash value and the stored hash value; and
enabling wireless network access pursuant to the step of determining, the wireless network access being in a prevented operation mode until a determination is made in the step of determining that the software used by the electronic device for accessing the wireless network remains unmodified based on the comparison of the another hash value and the stored hash value.

2. The method as in claim 1 wherein the electronic device transmits a signal to the wireless network indicating a result of the determining of whether the software used by the electronic device for accessing the wireless network remains unmodified.

3. A method for use in an electronic device including at least one software component and at least one hardware component, the method comprising:

performing an installation process comprising the steps of:
generating, in the electronic device, a hash value by performing a hashing algorithm on an identifier of the at least one software component and an identifier of the at least one hardware component; and
storing the generated hash value;

subsequent to performing the installation process, performing a start-up process comprising the steps of:
generating, in the electronic device, another hash value by performing the hashing algorithm on an identifier of the at least one software component and an identifier of the at least one hardware component;
comparing the another hash value with the stored hash value;
determining whether software used by the electronic device for accessing a wireless network remains unmodified based on the comparison of the another hash value and the stored hash value; and
enabling wireless network access pursuant to the step of determining, prior permitted wireless network access to the network now being prevented based upon a determination being made in the step of determining that the software used by the electronic device for accessing the wireless network has not remained unmodified based on the comparison of the another hash value and the stored hash value.

4. The method as in claim 3 wherein the electronic device transmits a signal to the wireless network indicating a result of the determining of whether the software used by the electronic device for accessing the wireless network remains unmodified.

5. A method for use in an electronic device including at least one software component and at least one hardware component, the method comprising:

performing an installation process comprising the steps of:
generating, in the electronic device, a hash value by performing a hashing algorithm on an identifier of the at least one software component and an identifier of the at least one hardware component; and
storing the generated hash value;

subsequent to performing the installation process, receiving, in the electronic device, a challenge signal and performing a process, in response to receipt of the challenge signal, comprising the steps of:
generating, in the electronic device, another hash value by performing the hashing algorithm on an identifier of the at least one software component and an identifier of the at least one hardware component;
comparing the another hash value with the stored hash value;
determining whether software used by the electronic device for accessing a wireless network remains unmodified based on the comparison of the another hash value and the stored hash value; and
enabling wireless network access pursuant to the step of determining, the wireless network access being in a prevented operation mode until a determination is made in the step of determining that the software used by the electronic device for accessing the wireless network remains unmodified based on the comparison of the another hash value and the stored hash value.

6. The method as in claim 5 wherein the electronic device transmits a signal to the wireless network indicating a result of the determining of whether the software used by the electronic device for accessing the wireless network remains unmodified.

7. A method for use in an electronic device including at least one software component and at least one hardware component, the method comprising:

performing an installation process comprising the steps of:
generating, in the electronic device, a hash value by performing a hashing algorithm on an identifier of the at least one software component and an identifier of the at least one hardware component; and
storing the generated hash value;

subsequent to performing the installation process, receiving, in the electronic device, a challenge signal and performing a process, in response to receipt of the challenge signal, comprising the steps of:
generating, in the electronic device, another hash value by performing the hashing algorithm on an identifier of the at least one software component and an identifier of the at least one hardware component;
comparing the another hash value with the stored hash value;
determining whether software used by the electronic device for accessing a wireless network remains unmodified based on the comparison of the another hash value and the stored hash value; and
enabling wireless network access pursuant to the step of determining, prior permitted wireless network access to the network now being prevented based upon a determination being made in the step of determining that the software used by the electronic device for accessing the wireless network has not remained unmodified based on the comparison of the another hash value and the stored hash value.

8. The method as in claim 7 wherein the electronic device transmits a signal to the wireless network indicating a result of the determining of whether the software used by the electronic device for accessing the wireless network remains unmodified.

9. An electronic device including at least one hardware component and at least one software component, the device comprising:
 a generator that, in performance of an installation process of the electronic device, generates a first hash value by performing a hashing algorithm on an identifier of the at least one software component and an identifier of the at least one hardware component;
 a memory that stores the first hash value;
 a generator that, in a start-up subsequent to the generation and storage of the first hash value, generates a second hash value by performing the hashing algorithm on an identifier of the at least one software component and an identifier of the at least one hardware component;
 a comparator to compare the second hash value with the stored first hash value and to determine whether software used by the electronic device for accessing a wireless network remains unmodified based on the comparison of the first hash value and the second hash value; and
 a wireless network access enabler that enables wireless network access pursuant to the determination of whether the software used by the electronic device for accessing the wireless network remains unmodified, the wireless network access being in a prevented operation mode until the determination is made that the software used by the electronic device for accessing the wireless network remains unmodified based on the comparison of the first hash value and the second hash value.

10. The electronic device as in claim 8 wherein said memory further comprises a removable card operatively coupled with the electronic device for storing the first hash value and/or the hashing algorithm.

11. The electronic device as in claim 8 further comprising a transmitter that transmits a signal indicative of the determination of whether the software used by the electronic device for accessing the wireless network remains unmodified.

12. The electronic device as in claim 8 further comprising an encrypter that encrypts the first hash value and a transmitter that transmits the encrypted first hash value from the electronic device to the wireless network.

13. An electronic device including at least one hardware component and at least one software component, the device comprising:
 a generator that, in performance of an installation process of the electronic device, generates a first hash value by performing a hashing algorithm on an identifier of the at least one software component and an identifier of the at least one hardware component;
 a memory that stores the first hash value;
 a receiver that, subsequent to the generation and storage of the first hash value, receives a challenge signal;
 a generator that, in response to the challenge signal, generates a second hash value by performing the hashing algorithm on an identifier of the at least one software component and an identifier of the at least one hardware component;
 a comparator to compare the second hash value with the stored first hash value and to determine whether software used by the electronic device for accessing a wireless network remains unmodified based on the comparison of the first hash value and the second hash value; and
 a wireless network access enabler that enables wireless network access pursuant to the determination of whether the software used by the electronic device for accessing the wireless network remains unmodified, the wireless network access being in a prevented operation mode until the determination is made that the software used by the electronic device for accessing the wireless network remains unmodified based on the comparison of the first hash value and the second hash value.

14. The electronic device as in claim 13 wherein said memory further comprises a removable card operatively coupled with the electronic device for storing the first hash value and/or the hashing algorithm.

15. The electronic device as in claim 13 further comprising a transmitter that transmits a response signal to the received challenge signal, the response signal indicating the determining of whether the software used by the electronic device for accessing the wireless network remains unmodified.

16. The electronic device as in claim 13 further comprising an encrypter that encrypts the first hash value and a transmitter that transmits the encrypted first hash value from the electronic device to the wireless network.

17. A computer readable computer program storage medium carrying a computer program for an electronic device including at least one software component and at least one hardware component, said program being capable, when executed, of effecting a method comprising:
 performing an installation process comprising the steps of:
  generating, in the electronic device, a first hash value by performing a hashing algorithm on an identifier of the at least one software component and an identifier of the at least one hardware component; and
  storing the first hash value;
 subsequent to performing the installation process, performing a start-up process comprising the steps of:
  generating, in the electronic device, a second hash value by performing the hashing algorithm on an identifier of the at least one software component and an identifier of the at least one hardware component;
  comparing the second hash value with the stored first hash value;
  determining whether software used by the electronic device for accessing a wireless network remains unmodified based on the comparison of the second hash value and the first hash value; and
  enabling wireless network access pursuant to the step of determining, the wireless network access being in a prevented operation mode until a determination is made in the step of determining that the software used by the electronic device for accessing the wireless network remains unmodified based on the comparison of the second hash value and the first hash value.

18. The computer readable computer program storage medium as in claim 17 further comprising the effecting the method of externally transmitting a signal indicative of the determination of whether the software used by the electronic device for accessing the wireless network remains unmodified.

19. The computer readable computer program storage medium as in claim 17 wherein the computer program, when executed, effects the method which further comprises encrypting the first hash value and transmitting the encrypted first hash value from the electronic device to the wireless network.

20. A computer readable computer program storage medium carrying a computer program for an electronic device including at least one software component and at least one hardware component, said program being capable, when executed, of effecting a method comprising:
- performing an installation process comprising the steps of:
  - generating, in the electronic device, a first hash value by performing a hashing algorithm on an identifier of the at least one software component and an identifier of the at least one hardware component; and
  - storing the first hash value;
- subsequent to performing the installation process, performing a process comprising the steps of:
  - receiving, in the electronic device, a challenge signal;
  - generating, in response to the receipt of the challenge signal, a second hash value by performing the hashing algorithm on an identifier of the at least one software component and an identifier of the at least on hardware component;
  - comparing the second hash value with the stored first hash value;
  - determining whether software used by the electronic device for accessing a wireless network remains unmodified based on the comparison of the second hash value and the first hash value; and
  - enabling wireless network access pursuant to the step of determining, the wireless network access being in a prevented operation mode until a determination is made in the step of determining that the software used by the electronic device for accessing the wireless network remains unmodified based on the comparison of the second hash value and the first hash value.

21. The computer readable computer program storage medium as in claim 20 further comprises the effecting the method of externally transmitting a response signal to the received challenge signal, the response signal indicating the determining of whether the software used by the electronic device for accessing the wireless network remains unmodified.

\* \* \* \* \*